United States Patent [19] [11] 4,349,301
Boyajian [45] Sep. 14, 1982

[54] CARRIAGE SUPPORT FOR POWER-DRIVEN HAND TOOL

[76] Inventor: Alfred Z. Boyajian, P.O. Box 811, Manhattan Beach, Calif. 90266

[21] Appl. No.: 144,318

[22] Filed: Apr. 28, 1980

[51] Int. Cl.[3] ........ B23B 45/14
[52] U.S. Cl. ........ 408/112; 408/20; 408/712; 29/560
[58] Field of Search ........ 408/112, 111, 110, 115 R, 408/20, 21, 712, 100; 29/560; 144/1 H

[56] References Cited

U.S. PATENT DOCUMENTS 2,038,422 4/1936 Decker ........ 408/712
2,888,965 6/1959 Phillips ........ 408/712
2,997,900 8/1961 Pugsley ........ 408/112

*Primary Examiner*—Leonidas Vlachos
*Attorney, Agent, or Firm*—Robert T. Gammons

[57] ABSTRACT

A carriage support for an electric, power-driven hand tool having a rotating chuck for receiving for rotation such tools as twist drills, disk saws, buffing and sanding disks, routing tools and the like comprising a carriage member which constitutes a primary support and spaced supporting arms thereon between which the housing of the power-driven hand tool can be positioned, one at least of the arms being movable relative to the other to embrace the housing placed therebetween, teeth mounted to the arms adapted to be engaged with the vent openings in the housing to fix the position of the housing relative to the carriage member and means for maintaining the arms in positions of engagement of the teeth with the vent holes. The carriage member is adapted to be mounted to a free-standing, secondary support with the axis of the chuck perpendicular to the supporting surface upon which the support rests and for movement perpendicularly toward and from the surface on which it rests or to be positioned on the surface of a workbench so that the axis of rotation of the chuck is parallel to the surface of the workbench.

23 Claims, 11 Drawing Figures

FOREIGN

DOMESTIC

CARRIAGE SUPPORT FOR POWER-DRIVEN HAND TOOL

BACKGROUND OF INVENTION

There are numerous supports for holding power tools designed to enable steadying the tool during use to provide for more precisely guiding the tool as it is being operated and also to relieve the user of fatigue from holding the tool for prolonged operations. The power tool with respect to which this invention is specifically concerned is the kind comprising a motor and chuck rotatable thereby contained within a housing provided with a handle to enable holding and guiding and otherwise manipulating a tool fixed in the chuck in an effective operative position. Such supports as are available are generally designed to support the tool with the axis of rotation of the chuck perpendicular to the surface of the workbench on which the support rests and for movement vertically with respect to the surface of the workbench or to support the tool with the axis of rotation of the chuck parallel to the surface of the workbench on which the support rests and are provided with a variety of clamping means for clamping the tool to the support, most of which requires an excessive amount of adjustment, alteration to some extent of the housing of the tool, and are of limited utility in that they are tailored to a particular manufacturer and so not universally useful. It is the purpose of this invention to provide a support of improved construction which will not only enable supporting the tool of the foregoing kind with its axis of rotation perpendicular, but also horizontal, and with an improved means for fixing the housing of the tool to a support which will accommodate power tools of the foregoing kind of substantially all known manufacture, both domestic and foreign, without alteration of the housing itself.

SUMMARY OF INVENTION

As herein illustrated, the device of this invention is designed to support a power-driven hand tool of the kind comprising a motor and chuck rotatable therewith contained within a housing provided with a suitable handle for effective manipulation thereof comprising means defining a carriage member which constitutes a primary support and spaced supporting arms thereon between which the housing of the tool can be positioned, one at least of the arms being movable relative to the other to embrace the housing of the tool placed therebetween.

In one form, designed especially for domestic power tools, there are means mounted on the arms adapted to be engaged with the vent openings in the housing of the tool at diametrically-opposed positions to fix the position of the housing relative to the carriage member and means for maintaining the arms in positions of engagement of the last-named means with the vent openings. Specifically, one of the supporting arms is fixed to the carriage member at right angles thereto so as to be stationary and the other is pivotally mounted on the member for swinging movement toward and from the stationary arm and there is means associated with the pivoted arm for fixing it in a predetermined position relative to the stationary arm. The means on the arms for engagement with the vent openings in the housing comprise teeth on the confronting sides of the arms dimensioned to enter the vent holes of the housing at different positions, certain of the teeth being stationary and others movable relative to the stationary teeth provided with means for effecting their adjustment relative to the stationary teeth to clamp the lattice between vent holes between the teeth. There are means for mounting the teeth to the confronting sides of the arm for movement longitudinally of the arms and transversely of the arms. The arms in their operative position are located at the opposite ends of the carriage member and perpendicular thereto and the carriage member itself is provided at its ends with bearing sleeves, the axes of which are perpendicular to the arms so that the carriage member is adapted to be mounted on a free-standing support comprising vertically-positioned, spaced, parallel posts fixed at one end to a base for sliding movement of the carriage member thereon toward and from the base and in which arrangement the arms support the housing of the power tool with the axis of the chuck perpendicular to the base. When used in this fashion, a helically-coiled spring is disposed about one of the posts between the carriage member and the base for holding the carriage member yieldably elevated from the base while permitting the carriage member to be moved vertically downwardly relative to the base and there is a stop member mounted on the other of the posts for limiting downward movement of the carriage member, the stop member being adjustable heightwise on the post. There is at the base a circular opening through which the instrumentality fixed within the chuck can be moved as it is lowered to its operative position and there are work supports in diametrically-opposed positions on the base adjacent the opening for receiving and supporting a workpiece in a position to be operated upon. For mounting directly to a workbench, the bearing sleeves at the opposite ends of the carriage are provided with flat bearing surfaces upon which the carriage member is adapted to rest with the arms perpendicular to the surface of the workbench, in which position the axis of rotation of the chuck of the power tool will be parallel to the surface of the workbench. Desirably, the carriage member is provided with spaced holes for receiving attaching means in the form of screws or bolts for fixing the carriage member to the top of the workbench when used in this fashion. Alternatively, the carriage may be provided with a boss by means of which it may be clamped between the jaws of a vise or C clamps may be employed to clamp the carriage to the bench.

The housings of foreign made powr tools have a cylindrical collar or extension adjacent the chuck which affords a convenient clamping surface. Accordingly, a modified form of carriage is provided wherein the supporting arms are arcuate to, in conjunction, encircle the collar and are provided at their distal ends with means for drawing them together into clamping engagement with the collar. As previously related, the carriage may be mounted on a free-standing support or directly on a workbench.

The invention will now be described in greater detail with reference to the accompanying drawings, wherein.

Motor-driven power tools of the kind comprising a motor-driven chuck contained in a housing provided with a handle to enable manipulation of the tool are of two makes: foreign; wherein the housing is provided with a fixed cylindrical collar or extension adjacent the chuck which provides a convenient clamping surface; and domestic, which have no such cylindrical collar or extension, but do have vent holes in the housing which provide convenient clamping structure. The device of this invention is designed on the one hand to be used for supporting domestic motor-driven power tools and in a modified form to support foreign motor-driven tools.

Figure 1:
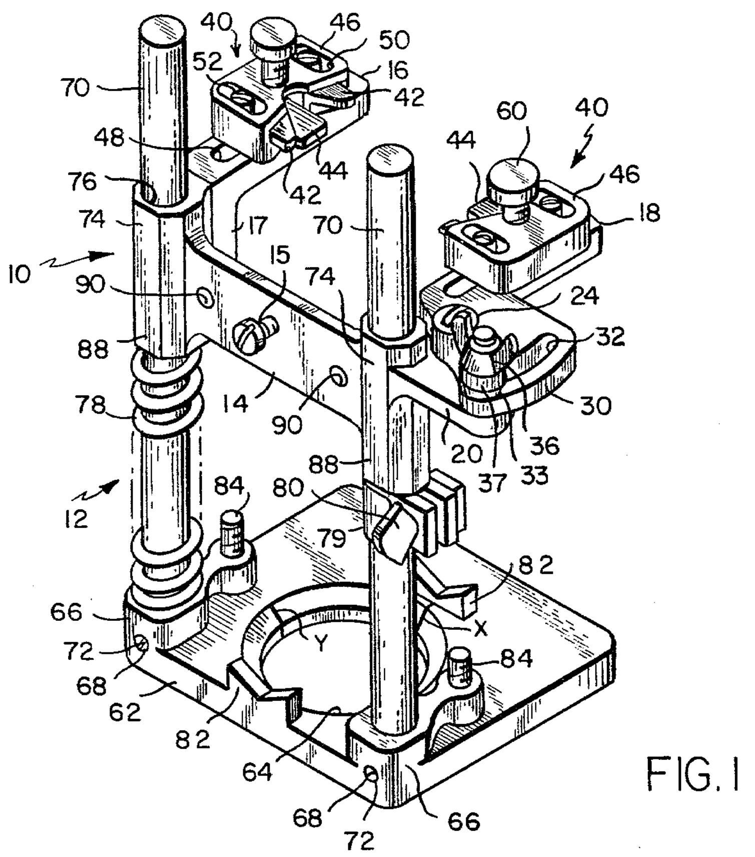
FIG. 1 is a perspective of the carriage support mounted on a free-standing support.
Figure 2:
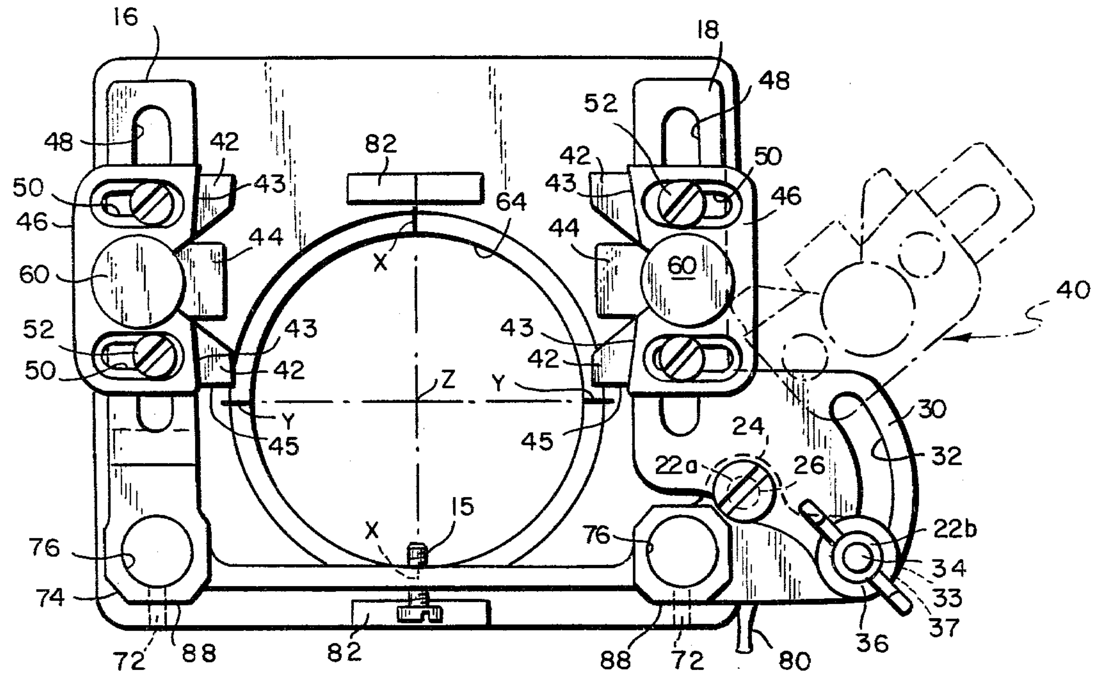
FIG. 2 is a plan view to larger scale of FIG. 1.
Figure 3:
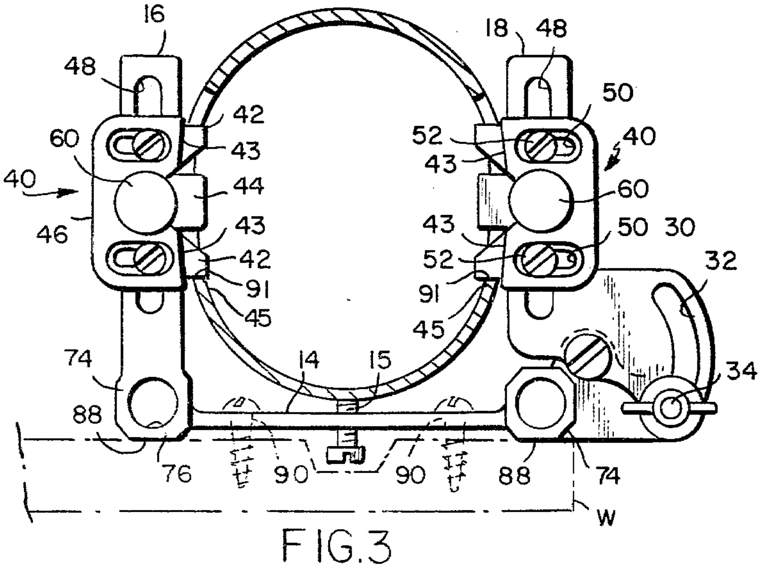
FIG. 3 is an elevation of the carriage support attached to the top of a workbench.

Referring specifically to FIGS. 1 to 7, there is shown a carriage 10 designed for domestic tools for mounting the power tool on a free-standing support 12 adapted to be placed on a workbench or other support with the axis of rotation of the chuck perpendicular and disposed for vertical movement of the tool toward and from the bench or support or, FIG. 3, for mounting directly to the top of a workbench W and attachment thereto with suitable attaching means with the axis of rotation of the chuck parallel to the surface of the workbench.

The carriage 10 comprises an elongate, rigid bar 14 at the opposite ends of which are mounted arms 16 and 18. The arm 16 is fixed to the bar 14 at right angles thereby by an angle arm 17 and, hence, is stationary with respect to the bar 14. The arm 18 is pivotally mounted to the bar 14 for swinging movement about its proximal end relative to the stationary arm. The mounting for the arm 18 comprises a bracket member 20 containing a vertically-disposed hole 22*a* within which there is mounted a pivot pin 24. The proximal end of the arm 18 contains a vertically-positioned hole 26 for receiving the pivot pin 24. The bracket member 20 contains a second vertically-positioned hole 22*b* spaced from the hole 22*a* and the proximal end of the arm 18 is provided with a lateral extension 30 containing an arcuate slot 32, the center of which is located at the center of the pivot pin 24 so that the second hole 22*b* will travel along the arc of the slot 32 when the arm 18 is swung about the pivot pin 24. Slot 32 has a conical depression 33 at one end. A threaded screw 34 is mounted in the hole 22*b* with an end extending through the slot 32, a conical washer 37, and a thumbnut 36 applied to the threaded end of the screw provides for locking the arm 18 in a predetermined position relative to the arm 16. It is thus possible to swing the movable arm relative to the stationary arm to bring the two arms into abutting engagement with the opposite sides of the housing of a tool placed therebetween and to lock the arms in this position.

Figure 5:
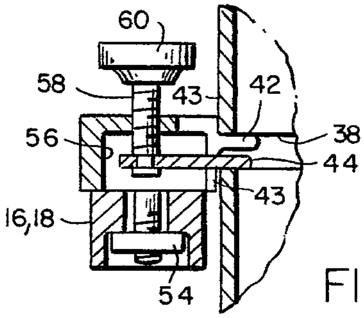
FIG. 5 is a vertical section taken on the line 5—5 of FIG. 4 to larger scale.
Figure 10:
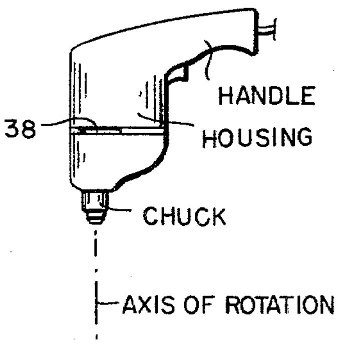
FIG. 10 is an elevation of a typical motor-driven power tool of domestic design provided with vent holes.

As previously stated, the housings of domestic power tools are universally provided with a plurality of vent openings 38, FIGS. 5 and 10, at diametrically opposite sides of the housing and in accordance with one aspect of the invention, clamping means 40—40 are provided on the two arms 16,18 for entering the vent holes when the arms are brought into engagement with the opposite sides of the housing to thus inhibit movement of the housing embraced between the arms in any direction. The clamping means 40—40 comprise stationary teeth 42—42 and movable teeth 44—44, FIGS. 2 and 4, and mounting blocks 46—46 which, in turn, are supported on the arms 16,18 for movement longitudinally of the arms and transversely thereof. To this end, the arms have longitudinal slots 48—48, the blocks have spaced, elongate slots 50—50 through which bolts 52—52 are inserted into and through the slots 48—48 in the arms and fastened therein by nuts 54—54 at the undersides of the arms. The stationary teeth 42—42 are spaced longitudinally of the blocks substantially intermediate the top and bottom side thereof, FIG. 6, extending inwardly in substantially horizontal planes and are vertically thin enough to enter the vent slots 38 in the tool housing. The movable teeth 44 are received in recesses 56 in the blocks between the stationary teeth and are movable relative to the stationary teeth by means of threaded studs 58, the lower ends of which extend into the recesses and are rotatably coupled to the movable teeth so that by rotation of the studs, the movable teeth can be raised relative to the stationary teeth. The studs 58 have knurled heads 60 at their upper ends to enable rotation thereof. It is thus possible when the respective teeth are engaged within the vent holes in the housing to move the movable teeth relative to the fixed teeth to engage the teeth with the upper and lower edges of the slots and thus effectively fix the position of the drill housing relative to the carriage. A nylon positioning screw 15 is threaded through the bar for a purpose which will appear hereinafter.

As has been previously mentioned, carriage 14 is designed to enable mounting the tool on a free-standing support 12 such as shown in FIGS. 1 and 2 or to mount it directly to the surface of the workbench, FIG. 3.

The free-standing support 12 as illustrated comprises a substantially rectangular base plate 62 containing a circular opening 64 which is positioned midway between the opposite sides of the base, but forwardly of the center between the front and back sides. At the front side there are socket members 66—66 provided with horizontally threaded openings 68—68, the sockets being dimensioned to receive the lower ends of posts 70—70 to hold the latter in spaced, parallel relation perpendicular to the base plate 62. Set screws 72—72 set into the threaded openings 68—68 provide for fixing the posts in position. In order to mount the carriage 14 on the posts 70—70, the carriage has at its opposite ends bearing sleeves 74—74 containing openings 76—76, the axes of which are perpendicular to the arms 16 and 18 for slidably receiving the posts 70—70 so that the carriage can be moved up and down on the posts relative to the base plate 62. The carriage is supported from the base by a helically-coiled spring 78 positioned about one of the posts 70 with its lower end resting on the upper end of the socket 66 on the base and its upper end engaged with the lower end of the sleeve 74, thus the carriage may be moved by application of pressure vertically toward the base and when released will be elevated therefrom. A limit stop 79 is mounted on the other of the posts in the form of a split clamp defining a hole for receiving the post and a thumbscrew 80 for drawing the clamp together into clamping engagement with the post.

For holding round work in position to be operated upon, there are provided a pair of V-shaped work supports 82—82, FIGS. 1 and 2, positioned diametrically opposite each other at opposite sides of the hole 64. There are diametrically arranged scribe lines x—x,y—y on the base, the scribe lines x—x coinciding with the bottom of the V-shaped work supports. The scribe lines y—y are at right angles to the scribe lines x—x.

The free-standing support 12 is also provided at its base with two center finders 84—84 positioned at diametrically opposite sides of the hole 64 on a diameter containing the scribe lines y—y which are at right angles to the scribe lines x—x. These center finders may be projected from the bottom side of the base plate 62 and by positioning them at opposite sides of the edge of a door, post, spindle or the like which is not wider than the distance between the center of the hole 64 and, hence, the axes of rotation of the instrumentality fixed in the chuck midway between the opposite sides of the workpiece.

Figure 8:
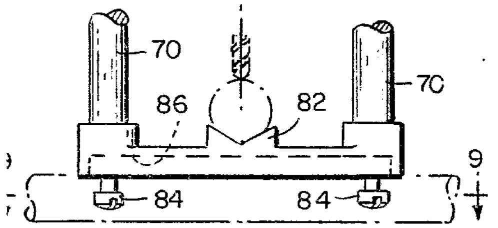
FIG. 8 is a fragmentary elevation of an optional structure adapting the free-standing support to the special use of drilling holes along the center line of a narrow workpiece.
Figure 9:
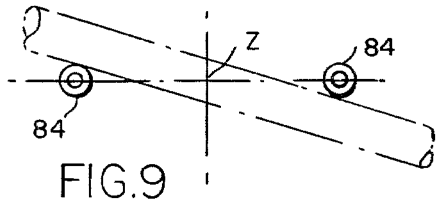
FIG. 9 is a plan view taken on the line 9—9 of FIG. 8.
Figure 4:
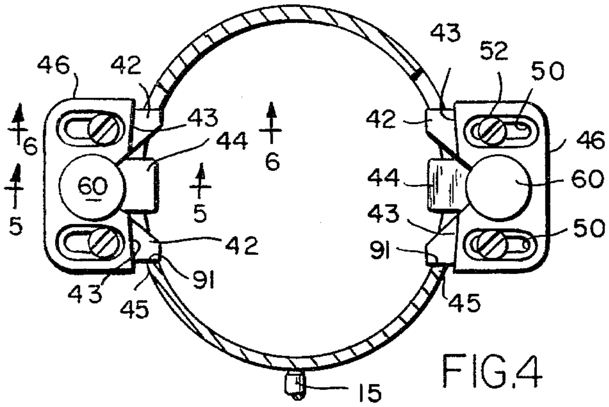
FIG. 4 is a top view of FIG. 1 omitting the supporting structure for the clamp assemblies showing in full lines the outline of a tool mounted between the assemblies.

As constructed, the plate 62 has an upwardly recessed cavity 86, FIG. 8, so that when the center finders 84—84 are not in use, they can be retracted within the cavity simply by screwing them upwardly within the threaded openings until their lower ends are above the lower edge of the base.

The intersection of the scribe lines x—x,y—y denoted at Z define the point on which an extension of the axis of rotation of the chuck is aligned and centered.

Assuming that a twist drill is fixed in the chuck of the power tool, the power tool with the drill is positioned so that the axis of the drill coincides with the point Z, whereupon the clamping means 40—40 are adjusted longitudinally within the vent openings until the forward teeth edges 45—45 bear against the leading edges of the vent holes 91—91, and laterally until faces 43—43 bear against the sides of the power drill housing. The knurled studs 60—60 are tightened, and bolts 52—52 are permanently tightened. The positioning screw 15 is also tightened against the power drill housing. This completes the alignment, which remains permanent.

This alignment is a one-time alignment, made the first time a power tool with drill is mounted on the free-standing support. Thereafter, each time the power tool with drill is removed and remounted in the support, by retightening knurled studs 60—60, the permanent alignment is automatically and instantly restored.

To facilitate the alignment, right angle intersecting lines may be drawn on paper and the free-standing support placed thereon so that the scribe lines x—x and y—y coincide with the intersecting lines drawn on the paper. A small diameter twist drill fixed in the chuck may be used to facilitate obtaining accurate alignment of the axis of rotation of the chuck with the center Z defined by intersection of the scribe lines x—x and y—y.

The scribe lines x—x,y—y may also serve as gauge marks to spot the drill axis directly on the centerlines of a hole to be drilled in the workpiece.

For the purpose of mounting the carriage 10 directly on a workbench, the bearing sleeves 74—74 are provided with flat, planar bearing surfaces 88—88, FIG. 3, and the member 14 is provided with spaced holes 90—90 so that the carriage can be placed flat on the surface of the workbench W and fastened thereby by means of screws or bolts. In this position, the arms 16 and 18 will extend perpendicularly upward from the surface of the workbench so that when the tool is clamped between the arms 16 and 18, the axis of rotation of the chuck will be parallel to the surface of the bench. This position of the carriage is particularly useful when using such instrumentalities as a circular saw and sanding disks or buffing disks. If desired, although not shown, a boss could be provided on the member 14 for clamping between the jaws of a vise.

Figure 7:
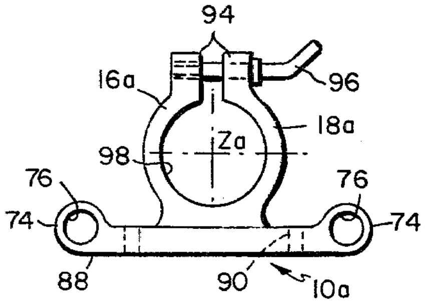
FIG. 7 is an elevation of an alternate form of carriage to be used in the event that the tool housing has a cylindrical collar adjacent to the chuck which is coaxial with the axis of rotation of the chuck.
Figure 11:
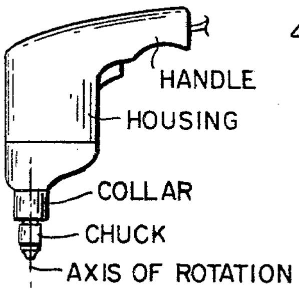
FIG. 11 is an elevation of a typical motor-driven power tool of foreign design provided with a cylindrical collar or extension adjacent and coaxial with the axis of rotation of the chuck.
Figure 6:
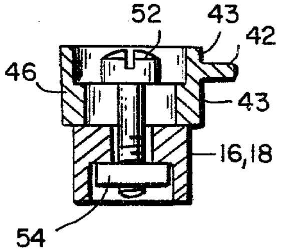
FIG. 6 is a vertical section taken on the line 6—6 of FIG. 4.

For motor-driven, power-operated tools of foreign manufacture, wherein the housing has a cylindrical collar or extension adjacent the chuck as shown in FIG. 11 which is coaxial with the axis of rotation of the chuck, a modified carriage 10*a* is employed such as shown in FIG. 7. The carriage 10*a* has arcuate arms 16*a*, 18*a* at the distal ends of which there are bosses 94—94, one of which is threaded for receiving a threaded clamp arm 96. The arcuate arms in conjunction define a circular opening 98 for encircling the cylindrical collar of the power tool. The center Za of the opening 98 is designed to be in alignment with the center Z at the base. Accordingly, no alignment is necessary for the power tool when mounted on the carriage 10*a*. The carriage 10*a* is interchangeable with the carriage 10 and can be mounted on the free-standing supporting structure 12 or directly on a workbench.

The principal advantages of the motor-driven power tool support as herein illustrated reside in the provision of a carriage designed to mount the power tools of both domestic and foreign manufacture for rotation of the axes of their chucks about axes perpendicular to the work supporting surface upon which it rests and for movement toward and from that surface or in a position with the axis of rotation of the chuck parallel to the surface on which it is supported, thus to enable not only using instrumentalities such as twist drills, routing devices and the like, but also circular saws, buffing and sanding disks and the like.

It should be understood that the present disclosure is for the purpose of illustration only and includes all modifications or improvements which fall within the scope of the appended claims.

What is claimed is:

1. A support for supporting an electric power-driven tool comprising a tool housing containing vent holes, an electric motor in the housing and a chuck coupled to the motor for rotation, comprising first means defining a carriage member adapted to support the tool housing in a position such that the axis of rotation of the chuck is perpendicular or horizontal second means mounted to the carriage member to clamp the tool housing thereto, said second means being transversely-spaced and dimensioned to be engaged with the vent holes of the tool housing at diametrically opposite sides thereof, third means mounting one of said second means for movement relative to the other and fourth means for fixing said third means in a position of engagement of said second means with the vent holes after being positioned therein.

2. A support according to claim 1 wherein the second means comprise teeth dimensioned to enter into the vent openings.

3. A support according to claim 1 wherein the second means comprises a plurality of teeth dimensioned to enter the vent holes at different positions.

4. A support according to claim 3 wherein certain of the teeth are stationary and others are movable relative to the stationary teeth to clamp against sides of the openings.

5. A device according to claim 4 comprising threaded means coupled to the movable teeth to effect clamping movement thereof relative to the stationary teeth.

6. A support according to claim 1 wherein said second means are transversely-spaced supporting arms and teeth on the confronting sides of said supporting arms.

7. A support according to claim 1 wherein the first means comprises transversely-spaced arms between which the tool housing can be positioned and wherein the secondnamed means are at the confronting sides of the arms.

8. A support according to claim 7 wherein one of the arms is stationary and the other supported for movement toward and from the stationary arm by said third means.

9. A support according to claim 7 wherein one of the arms is stationary and the other is pivotally supported for movement toward and from the stationary arm by said third means.

10. A support according to claim 9 wherein said fourth means is an arcuate slot provided with a conical depression and a bolt, conical washer, and thumbnut associated with the movable arm and carriage so that the bolt extends through the slot and washer, and the nut can be rotated on the bolt to draw the arm and carriage into locking engagement with each other.

11. A device according to claim 7 wherein the first means is a carriage having transversely-spaced flat bearing surfaces positioned to support the carriage with the arms perpendicular to the surface on which it rests and means for receiving fastening elements to secure the carriage in a stationary position on the surface on which it rests.

12. A support according to claim 7 wherein there is a positioning screw threaded through the first means midway between its opposite ends for rotation about an axis parallel to the plane defined by the arms and at right angles to the carriage.

13. A support according to claim 12 wherein the screw is a nylon screw.

14. A device according to claim 7 wherein the support includes a base and spaced, parallel posts fastened at their lower ends to the base and wherein the first means is provided with spaced, parallel bearing sleeves for receiving said posts such that when the first means is mounted on the posts, the transversely-spaced arms are parallel to the base.

15. A support according to claim 14 wherein there is a coiled spring positioned about one of the posts between the carriage and the base.

16. A support according to claim 15 wherein there is a clamp collar positioned about the other post between the carriage and the base and means for fixing it at a predetermined height thereon.

17. A support according to claim 14 comprising a work support at the top side of the base.

18. A support according to claim 14 wherein the base contains an opening positioned such that its center coincides with the axis of the tool supported by said support and there are work supports at diametrically opposite sides of said openings.

19. A support according to claim 18 wherein the base has at diametrically opposite sides of the opening scribe lines that intersect at the center of the opening.

20. A support according to claim 19 wherein one of the diametrically-positioned scribe lines coincides with the work support.

21. A support açcording to claim 14 comprising a pair of diametrically-mounted center finding members at the bottom side of the base.

22. A support according to claim 21 wherein the base contains at its bottom side a recess within which the center finding members can be retracted.

23. A support according to claim 14 wherein the axis of rotation of the tool when mounted between the arms is spaced from and parallel to the plane of the axes of the posts.

* * * * *